United States Patent
Itoh (10) Patent No.: US 6,922,602 B2
(45) Date of Patent: Jul. 26, 2005

(54) METHOD AND DEVICE FOR GENERATING SHEET METAL MODEL FROM SOLID MODEL

(75) Inventor: Shinya Itoh, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/786,058

(22) Filed: Feb. 26, 2004

(65) Prior Publication Data

US 2005/0071030 A1 Mar. 31, 2005

(30) Foreign Application Priority Data

Sep. 30, 2003 (JP) ...................................... 2003-341132

(51) Int. Cl.$^7$ .............................................. G06F 19/00
(52) U.S. Cl. ........................... 700/118; 700/29; 700/98; 700/182; 345/419
(58) Field of Search ............................. 700/29, 31, 98, 700/118, 122, 182; 345/419

(56) References Cited

U.S. PATENT DOCUMENTS

| | | | | |
|---|---|---|---|---|
| 4,912,644 | A | * | 3/1990 | Aoyama et al. ............... 700/98 |
| 6,490,498 | B1 | * | 12/2002 | Takagi ......................... 700/159 |
| 6,542,937 | B1 | * | 4/2003 | Kask et al. .................. 719/328 |
| 2002/0065790 | A1 | * | 5/2002 | Oouchi ........................ 705/400 |
| 2004/0148046 | A1 | * | 7/2004 | Fukumura .................... 700/97 |

FOREIGN PATENT DOCUMENTS

| | | | | |
|---|---|---|---|---|
| JP | 07141527 | * | 6/1995 | ........... G06T/17/00 |
| JP | 11-175575 | | 7/1999 | |
| JP | 2001306638 A | * | 11/2001 | ........... G06F/17/50 |
| JP | 2003108212 A | * | 4/2003 | ......... G05B/19/418 |

* cited by examiner

*Primary Examiner*—Leo Picard
*Assistant Examiner*—Sheela S. Rao
(74) *Attorney, Agent, or Firm*—Staas & Halsey LLP (57) ABSTRACT

The method includes the steps of assigning entered attribution information including material and thickness of a sheet metal to a specified solid model, assigning entered designation information for designating an open plane and a bending portion to the solid model, obtaining a minimum radius of curvature at the bending portion from the material and the thickness of the sheet metal, generating a downsized model defined by the designated open plane and a plurality of planes that are generated by moving a plurality of planes of the solid model except the open plane inward in parallel by a distance that is a sum of the thickness of the sheet metal and the minimum radius of curvature, generating inner wall surfaces by moving a plurality of surfaces of the downsized model except for the open plane outward in parallel by a distance that is equal to the minimum radius of curvature, generating plate portions by a projection process in which the inner wall surfaces are further moved outward in parallel by a distance that is equal to the thickness of the sheet metal, and generating a bending portion form that is a fillet connecting neighboring plate portions at the bending portion designated in the solid model.

7 Claims, 11 Drawing Sheets

METHOD AND DEVICE FOR GENERATING SHEET METAL MODEL FROM SOLID MODEL

BACKGROUND OF THE INVENTION

1. Field of the Invention

The present invention relates to a method and a device for generating a sheet metal model that can be unfolded automatically, from a solid model obtained by modeling a schematic solid shape of a sheet metal product, by a simple operation in a three-dimensional sheet metal CAD/CAM system.

2. Description of the Prior Art

Figure 1:
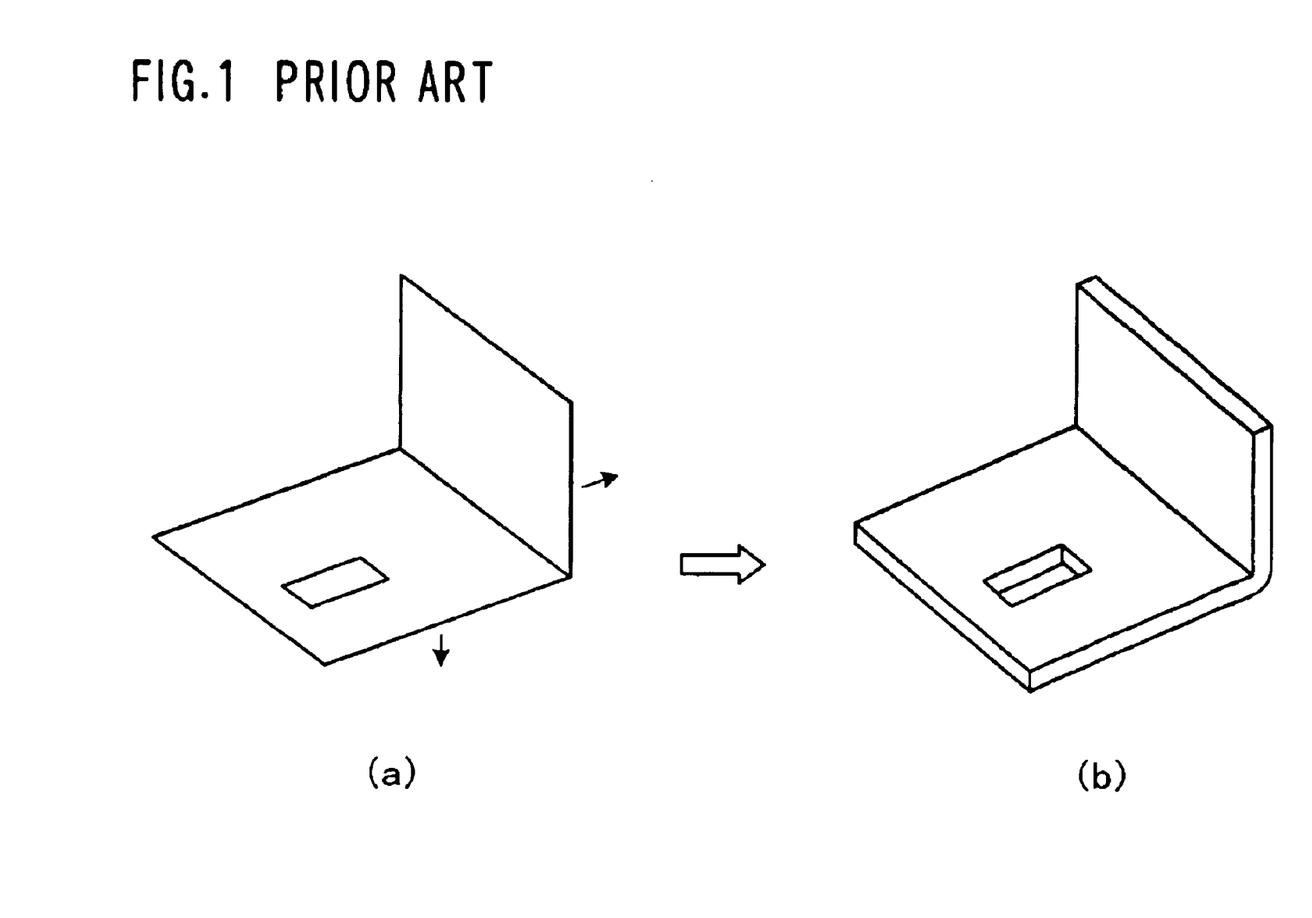
FIG. 1 shows a first conventional method for generating a three-dimensional sheet metal model by offsetting a paper model in the thickness direction.

In the conventional three-dimensional sheet metal CAD/CAM system, a sheet metal model is usually generated by one of the two methods explained as below. A first method is shown in FIG. 1. In this method, a so-called paper model having zero thickness as shown in (a) is generated first. Then, a sheet metal model as shown in (b) is generated by offsetting the paper model in the thickness direction. This type of method for generating a sheet metal model is explained in Japanese unexamined patent publication No. 11-175575, for example.

Figure 2:
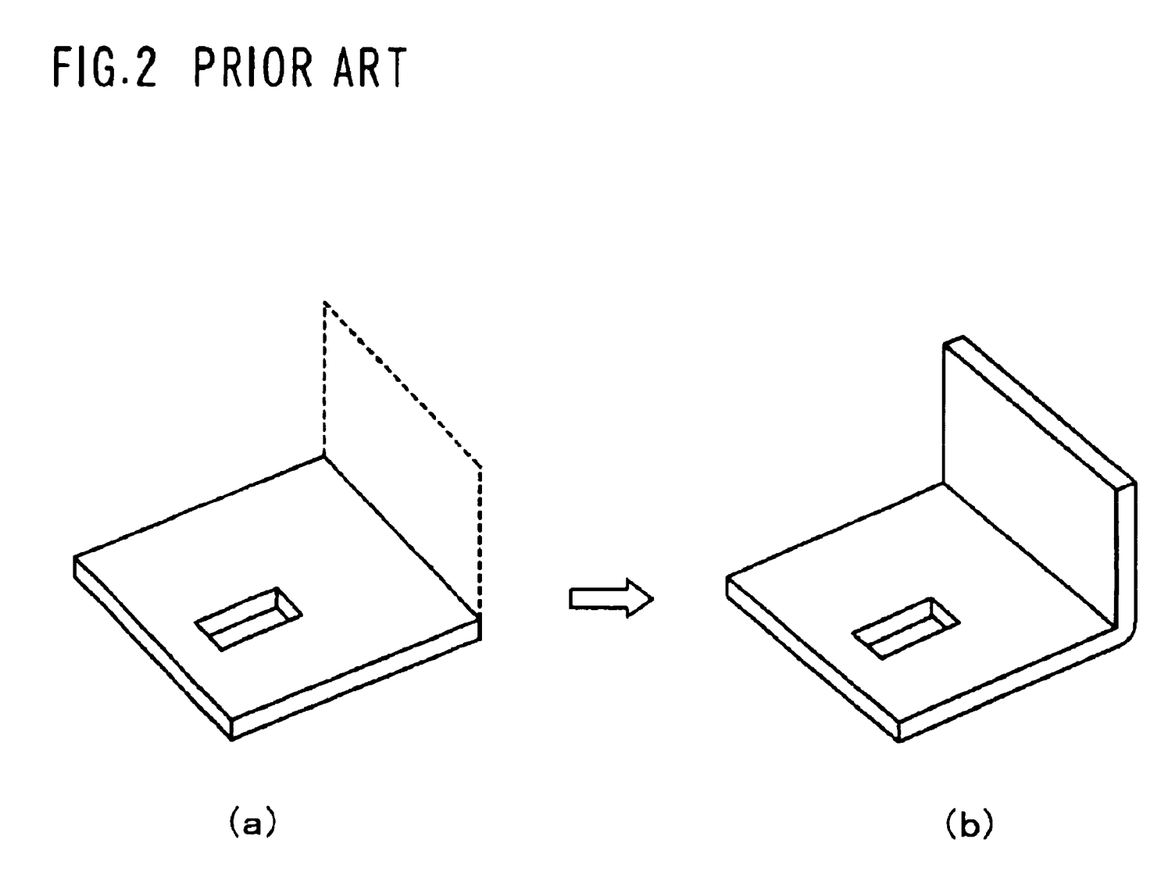
FIG. 2 shows a second conventional method for generating a three-dimensional sheet metal model by adding a bending portion to an edge portion of a base portion represented by a plate model having a thickness.

A second conventional method for generating a sheet metal model is shown in FIG. 2. In this method, a base portion (plane) of a sheet metal product is generated by using a plate model having a thickness as shown in (a) first. Then, a bending portion is added to an edge portion of the base portion so that the sheet metal model as shown in (b) is generated.

Figure 3:
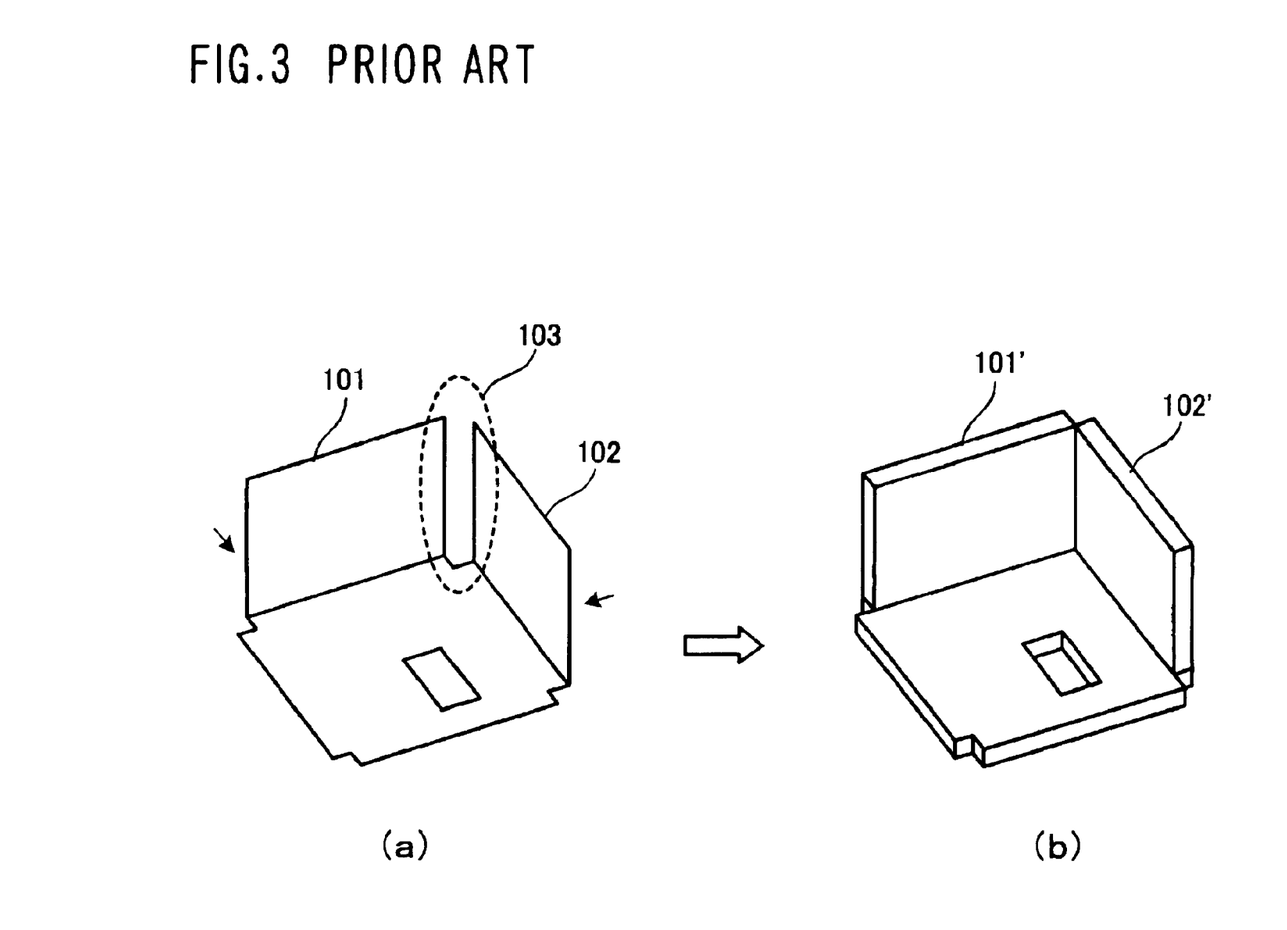
FIG. 3 shows an example of a difficulty in generating a sheet metal model from a paper model.

In the above-mentioned first conventional method for generating a sheet metal model, there is a case where it is difficult to represent a shape of a sheet metal product having a thickness. For example, when generating side faces 101' and 102' of the sheet metal model by offsetting two neighboring side faces 101 and 102 inward by a distance of thickness as shown in FIG. 3, an interference will be generated between the neighboring side faces 101' and 102'. In order to avoid this interference, it is necessary to keep a gap previously as shown in a portion 103 enclosed by a broken line. Such an operation is burdensome with some difficulty when the shape becomes complicated.

Figure 4:
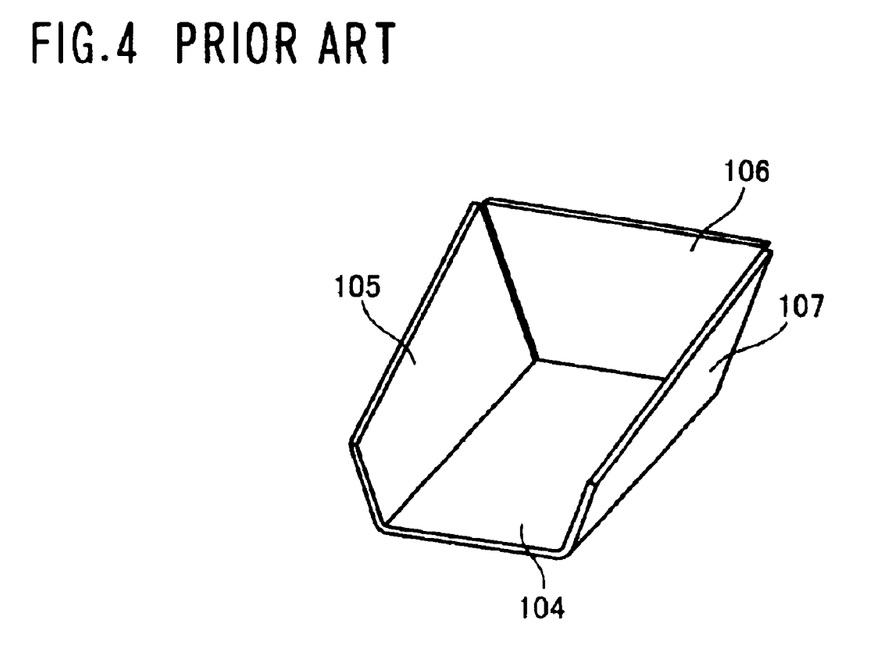
FIG. 4 shows an example of a difficulty in generating a sheet metal model by adding a bending portion to a plate model.

In addition, the above-mentioned second conventional method for generating a sheet metal model has a disadvantage that it takes a long time for modeling a product. Moreover, if side faces 105, 106 and 107 that are bending portions from the base plane 104 are not perpendicular to the base plane 104 (i.e., if they are inclined planes) as shown in FIG. 4, it becomes difficult to represent a shape of a sheet metal product. Namely, it becomes difficult to make a form of a joining portion between the neighboring side faces (e.g., side faces 105 and 106).

It is not desirable to force a designer to use a special modeling method only for designing a sheet metal product under an environment where a three-dimensional CAD is commonly used for designing. If a three-dimensional CAD system that is mainly used for designing a solid model can be used for designing a sheet metal model that can be unfolded automatically, in the same manner as a usual machine component, the system will be accepted by designers easily.

SUMMARY OF THE INVENTION

An object of the present invention is to provide a method and a device for generating a sheet metal model that can be unfolded automatically, from a solid model obtained by modeling a schematic solid shape of a sheet metal product by an easy operation in a three-dimensional sheet metal CAD/CAM system.

According to one aspect of the present invention, a method for generating a sheet metal model is provided. The method is used for generating a sheet metal model that can be unfolded automatically, from a solid model obtained by modeling an outer shape of a sheet metal product in a three-dimensional sheet metal CAD/CAM system. The method includes the steps of assigning entered attribution information including material and thickness of a sheet metal to a specified solid model, assigning entered designation information for designating an open plane and a bending portion to the solid model, obtaining a minimum radius of curvature at the bending portion from the material and the thickness of the sheet metal, generating a downsized model defined by the designated open plane and a plurality of planes that are generated by moving a plurality of planes of the solid model except the open plane inward in parallel by a distance that is a sum of the thickness of the sheet metal and the minimum radius of curvature, generating inner wall surfaces by moving a plurality of surfaces of the downsized model except for the open plane outward in parallel by a distance that is equal to the minimum radius of curvature, generating plate portions by a projection process in which the inner wall surfaces are further moved outward in parallel by a distance that is equal to the thickness of the sheet metal, and generating a bending portion form that is a fillet connecting neighboring plate portions at the bending portion designated in the solid model.

In a preferred embodiment, a thickness input box and a material selection pull-down menu are displayed as a screen display for entering the material and the thickness of the sheet metal, and an entered thickness value in the thickness input box is used as a key for searching a material master file so that one or more found materials registered in connection with the entered thickness value are listed in the pull-down menu.

According to another aspect of the present invention, a sheet metal model generation device that constitutes a three-dimensional sheet metal CAD/CAM system is provided. The device includes a solid model generation portion for generating a solid model by modeling an outer shape of a sheet metal product, an attribution information assigning portion for assigning entered attribution information including material and thickness of a sheet metal to the solid model, an open plane and bending portion designation portion for assigning entered designation information for designating an open plane and a bending portion to the solid model, a minimum radius of curvature obtaining portion for obtaining a minimum radius of curvature at the bending portion from the entered material and thickness of the sheet metal, a downsized model generation portion for generating a downsized model defined by the designated open plane and a plurality of planes that are generated by moving a plurality of planes of the solid model except the open plane inward in parallel by a distance that is a sum of the thickness of the sheet metal and the minimum radius of curvature, a plate portion generation portion for generating inner wall surfaces by moving a plurality of surfaces of the downsized model except for the open plane outward in parallel by a distance that is equal to the minimum radius of curvature and for generating plate portions by a projection process in which the inner wall surfaces are further moved outward in parallel by a distance that is equal to the thickness of the sheet metal, and a bending portion form generation portion for generating a bending portion form that is a fillet connecting neighboring plate portions at the bending portion designated in the solid model.

In a preferred embodiment, the attribution information assigning portion makes a screen display of a thickness input box and a material selection pull-down menu, uses an entered thickness value in the thickness input box as a key for searching a material master file so that one or more found materials registered in connection with the entered thickness value are listed in the pull-down menu.

According to still another aspect of the present invention, a computer program product is provided that is installed in a computer that constitutes a three-dimensional sheet metal CAD/CAM system. The computer program makes the computer execute the process for generating a sheet metal model including the steps of assigning entered attribution information including material and thickness of a sheet metal to a specified solid model, assigning entered designation information for designating an open plane and a bending portion to the solid model, obtaining a minimum radius of curvature at the bending portion from the material and the thickness of the sheet metal, generating a downsized model defined by the designated open plane and a plurality of planes that are generated by moving a plurality of planes of the solid model except the open plane inward in parallel by a distance that is a sum of the thickness of the sheet metal and the minimum radius of curvature, generating inner wall surfaces by moving a plurality of surfaces of the downsized model except for the open plane outward in parallel by a distance that is equal to the minimum radius of curvature, generating plate portions by a projection process in which the inner wall surfaces are further moved outward in parallel by a distance that is equal to the thickness of the sheet metal, and generating a bending portion form that is a fillet connecting neighboring plate portions at the bending portion designated in the solid model.

In a preferred embodiment, the computer program makes a screen display of a thickness input box and a material selection pull-down menu for entering a material and a thickness of a sheet metal, uses an entered thickness value in the thickness input box as a key for searching a material master file so that one or more found materials registered in connection with the entered thickness value are listed in the pull-down menu.

According to the method and the device of the present invention, a user can generate a sheet metal model in a simple operation that can be unfolded automatically, from a solid model obtained by modeling an outer shape of a sheet metal product. As a result, man-hours necessary for generating a development in a design division and a process division can be reduced substantially.

According to the preferred embodiment, the user can save operation strokes and time for entering an attribution that is used for generating a sheet metal model. In addition, an input error, i.e., designation of a thickness and a material of a sheet metal that are not registered as a possible combination can be avoided.

According to a computer program product of the present invention, the above-explained effects of the method and device can be obtained by installing the computer program into a personal computer or other computers. Such a computer program can be supplied in a form stored in a computer-readable storage medium such as CD-ROM and is installed into a computer.

DESCRIPTION OF THE PREFERRED EMBODIMENTS

Hereinafter, the present invention will be explained more in detail with reference to embodiments and drawings.

Figure 5:
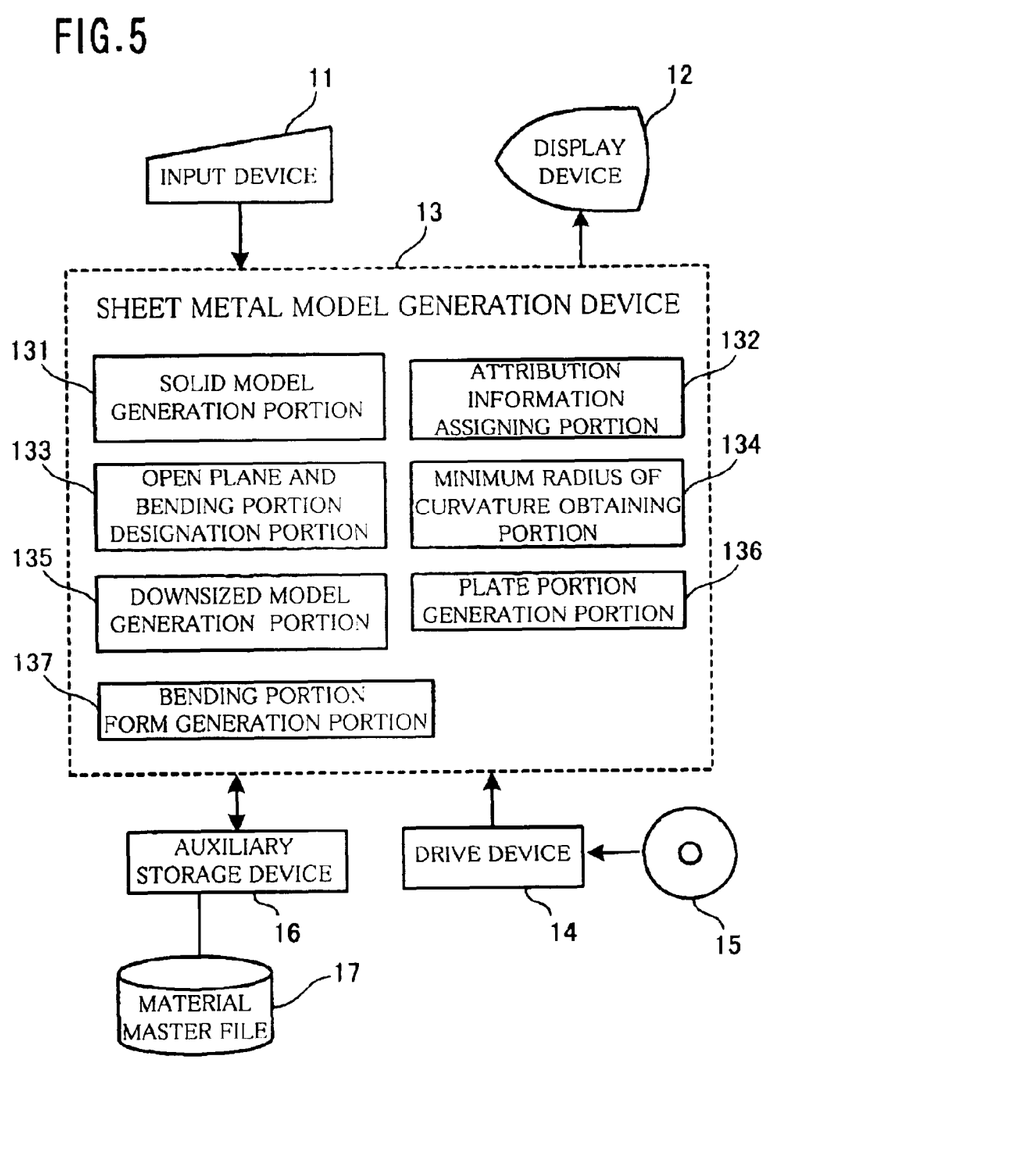
FIG. 5 is a block diagram showing a structure including a sheet metal model generation device in a CAD/CAM system according to an example of the present invention.

FIG. 5 is a block diagram showing a structure including a sheet metal model generation device in a CAD/CAM system according to an example of the present invention. A computer system that is used for a CAD process in a CAD/CAM system is shown. This system is constituted by installing a CAD program (software) into a computer system such as a personal computer. The computer system includes a central processing unit (CPU), a main memory, an input device 11 such as a keyboard or a mouse, a display device 12 such as a CRT or an LCD, an auxiliary storage device 16 such as a hard disk drive, and a drive device 14 for a removable storage medium.

A CAD program that constitutes the sheet metal model generation device according to the present invention is supplied in a form recorded on a removable storage medium 15 such as an optical disk (CD-ROM) and is installed into the auxiliary storage device 16 via the drive device 14. The CAD program installed in the auxiliary storage device 16 is loaded into the main memory and is executed by the CPU. In the structure shown in FIG. 5, the CPU and the main memory (the CAD program loaded into the main memory) mainly constitute a CAD system, and a portion of the CAD system that is related to generation of a sheet metal model according to the present invention is shown as a sheet metal model generation device 13 including functional blocks.

The sheet metal model generation device 13 includes a solid model generation portion 131, an attribution information assigning portion 132, an open plane and bending portion designation portion 133, a minimum radius of curvature obtaining portion 134, a downsized model generation portion 135, a plate portion generation portion 136, and a bending portion form generation portion 137.

The solid model generation portion 131 has a function of generating a solid model (like a block) by modeling an outer shape of a sheet metal product using a general feature having no attribution (such as a thickness) of a sheet metal. This function is realized by a general purpose three-dimensional CAD system.

The attribution information assigning portion 132 has a function of assigning entered attribution information including material and thickness of a sheet metal to a specified solid model. The specified solid model is a solid model that a user specifies as an object of generating a sheet metal model among a plurality of solid models including a solid model generated in the above-mentioned solid model generation portion 131, a solid model retrieved from the auxiliary storage device 16 and a solid model entered externally. Input of the material and the thickness of a sheet metal is performed as explained later.

The open plane and bending portion designation portion 133 has a function of assigning designation information entered by the user for designating an open plane and a bending portion to the solid model in which the outer shape of the sheet metal product is represented. The designation information for designating an open plane and a bending portion is necessary for generating a sheet metal model from a block-like solid model. The designation information includes information for designating an open plane in a real sheet metal product and information for designating a portion in which a sheet metal is bent (i.e., a ridge line) in a real sheet metal product.

The minimum radius of curvature obtaining portion 134 has a function of obtaining a minimum radius of curvature at the bending portion from the entered material and thickness of the sheet metal. This is obtained by searching a material master file 17 that is stored in the auxiliary storage device 16. Namely, the material master file 17 includes information of the minimum radius of curvature that was defined previously in accordance with materials and thickness values. However, it is possible to obtain the minimum radius of curvature by calculation from a thickness and a coefficient that indicates the susceptibility of a material to bend.

The downsized model generation portion 135 has a function of generating a downsized model defined by the designated open plane and a plurality of planes that are generated by moving a plurality of planes of the solid model except the open plane inward in parallel by a distance that is a sum of the thickness of the sheet metal and the minimum radius of curvature. This downsized model is a solid model smaller than the outer shape of the sheet metal product by a sum of the thickness and the minimum radius of curvature except for the open plane.

The plate portion generation portion 136 has a function of generating inner wall surfaces by moving a plurality of surfaces of the downsized model except for the open plane outward in parallel by a distance that is equal to the minimum radius of curvature, and generating plate portions by a projection process in which the inner wall surfaces are further moved outward in parallel by a distance that is equal to the thickness of the sheet metal. This plate portion has the above-mentioned inner wall surface, an outer wall surface obtained by moving the inner wall surface further outward in parallel by a distance that is equal to the thickness, and filling matter between the inner wall surface and the outer wall surface. Therefore, the plate portion has a thickness.

The bending portion form generation portion 137 has a function of generating a bending portion form that is a fillet connecting neighboring plate portions (end surfaces thereof) generated as explained above, at the bending portion designated in the solid model. This fillet can be generated as an extruded member of sector shape defined by the minimum radius of curvature, the radius larger than the minimum radius of curvature by the thickness and end faces of the neighboring plate portions.

Figure 6:
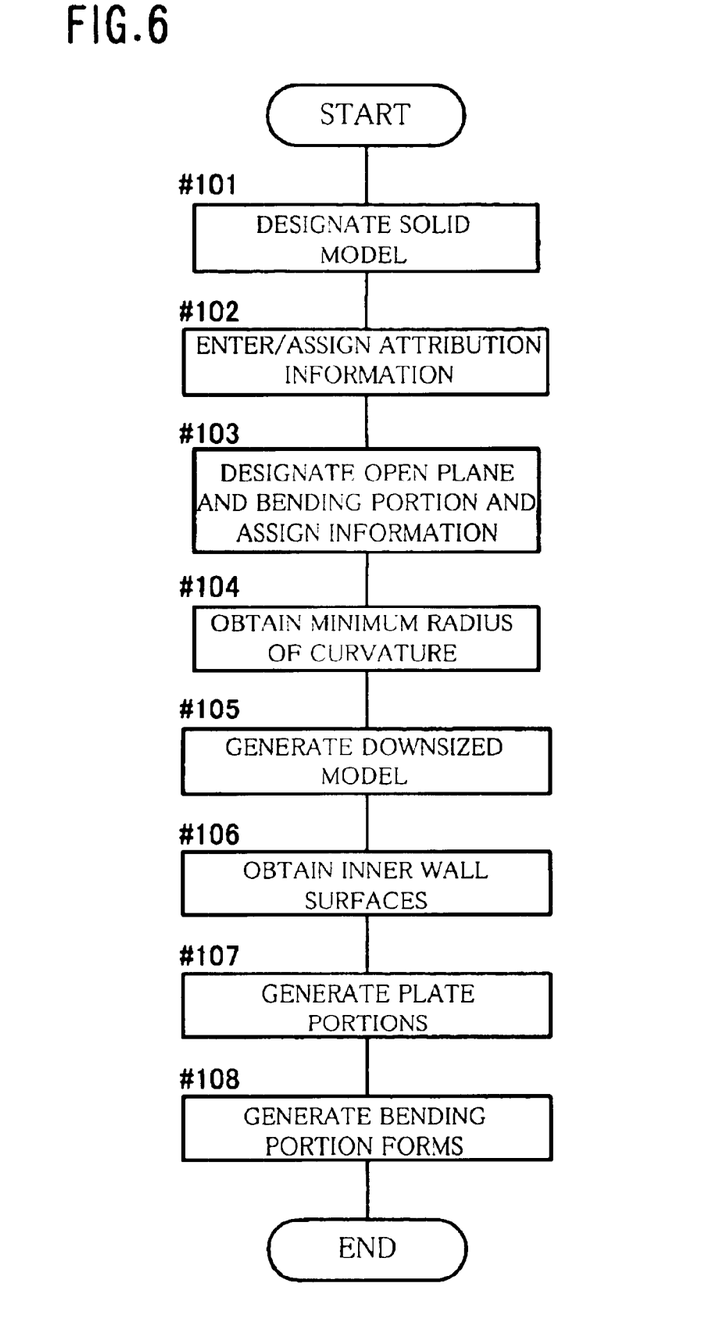
FIG. 6 is a flowchart showing a procedure of generating a sheet metal model from a solid model in the example of the present invention.

FIG. 6 is a flowchart showing a procedure of generating a sheet metal model from a solid model in the example of the present invention. This procedure corresponds to a procedure for the CPU of the sheet metal model generation device 13 to execute in accordance with a computer program. It also corresponds to a procedure for each portion of the above-mentioned sheet metal model generation device 13 to perform as a whole.

In the step #101, a solid model is designated. This is a process in which the user specifies as an object of generating a sheet metal model among a plurality of solid models including a solid model generated in the above-mentioned solid model generation portion 131, a solid model retrieved from the auxiliary storage device 16 and a solid model entered externally.

In the next step #102, the entered attribution information including material and thickness of a sheet metal is assigned to the above-mentioned specified solid model. Input of the material and the thickness of a sheet metal is performed as below, for example.

Figure 7:
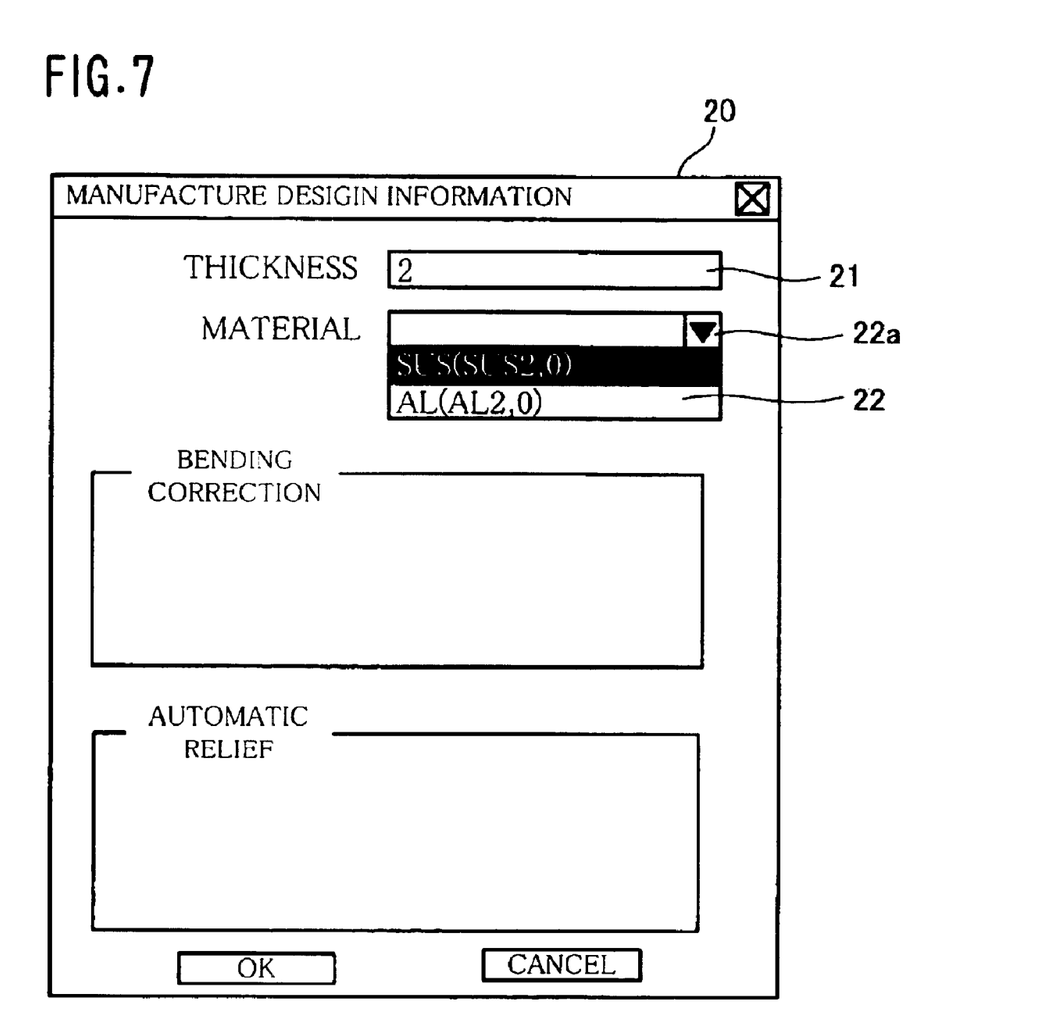
FIG. 7 shows an example of a display window for entering attribution information including a thickness and a material of a sheet metal in the example of the present invention.

FIG. 7 shows an example of a display window for entering attribution information including a thickness and a material of a sheet metal in the example of the present invention. This input display window 20 includes a thickness input box 21 and a material selection pull-down menu 22. When the user enters a desired thickness value (2 mm in the illustrated example) in the thickness input box 21, the attribution information assigning portion 132 searches a material master file 17 stored in the auxiliary storage device 16 by using the thickness value as a key. When one or more materials registered in connection with the entered thickness value are found as a result, the materials are listed in the material selection pull-down menu 22.

When the user clicks the triangular mark 22a at the right side of the material input box by using a pointing device, a pull-down menu 22 listing the above-mentioned materials appear. In the illustrated example, stainless steel (SUS) and aluminum (AL) are listed in the pull-down menu 22. The user can select a desired material from the listed materials. In this way, the user can save operation strokes and time for entering an attribution. In addition, an input error, i.e., designation of a thickness and a material of a sheet metal that are not registered as a possible combination can be avoided.

Figure 8A:
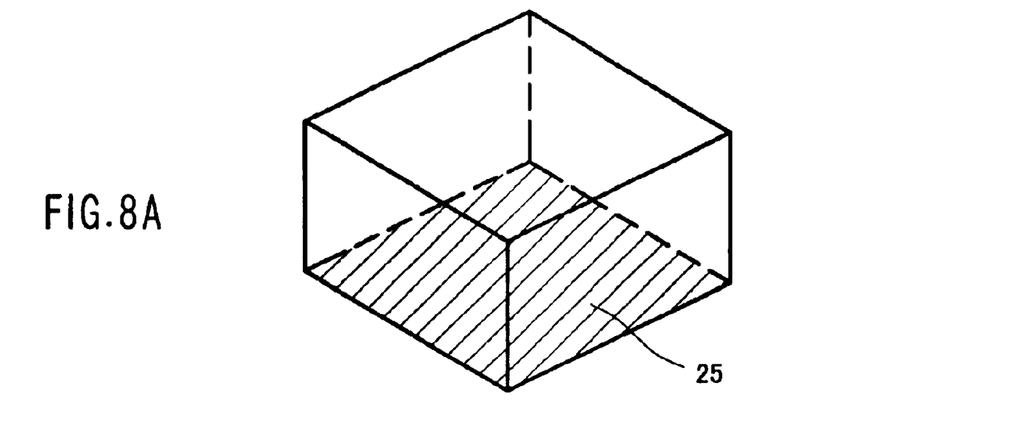
FIGS. 8A and 8B show examples of designation of an open plane and bending portions in the example of the present invention.
Figure 8B:
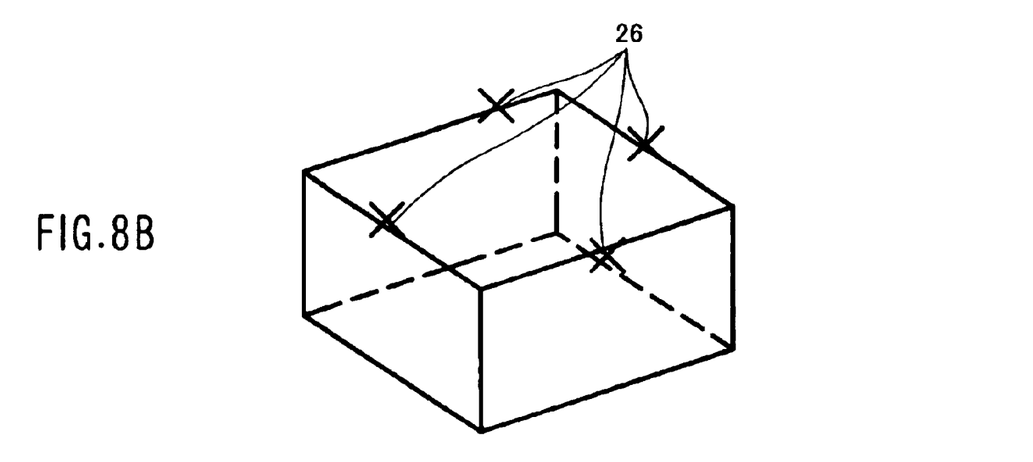

With reference to FIG. 6 again, an open plane and a bending portion are designated, and the designation information is assigned in the step #103. FIGS. 8A and 8B show examples of designation of an open plane and bending portions in the example of the present invention. In this example, the sheet metal model to be generated is a box having a rectangular shape, in which one of six planes (the bottom plane in the illustrated example) 25 is an open plane. For example, the bottom plane becomes a designated state when the user clicks a point around the middle portion of the bottom plane of the solid model by using a pointing device. For example, a display color of the bottom plane is changed for informing the user that it is selected. The selected bottom plane is shown with hatching in FIG. 8A.

In addition, each of the selected four bending portions (four ridge lines) is shown with a mark "x" in FIG. 8B. In the real embodiment, a color of the selected bending portion (ridge line) is changed for distinguishing from other lines so that the user can see that the bending portion is selected. For example, a pointing device is used for clicking the four sides of the upper plane of the solid model one by one so that the four bending portions are selected.

In the next step #104, a minimum radius of curvature at the bending portion is obtained. As explained above, a value of the minimum radius of curvature corresponding to the material and the thickness is obtained from the material master file 17 stored in the auxiliary storage device 16. Alternatively, the minimum radius of curvature is calculated from the thickness and a coefficient that indicates the susceptibility of a material to bend.

Figure 9A:
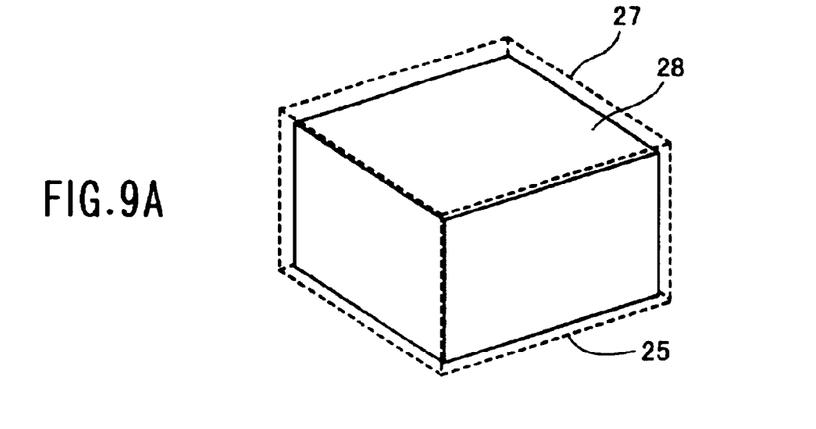
FIGS. 9A–9C show examples of generation of a downsized model, plate portions and bending portion forms.

In the next step #105, a downsized model is generated. The downsized model is a solid model defined by a plurality of planes that are generated by moving a plurality of planes of the solid model representing an outer shape of the sheet metal product inward by a distance that is a sum of the thickness of the sheet metal and the minimum radius of curvature. However, the open plane that was designated in the step #103 is used as it is without being moved inward. This process is shown in FIG. 9A. The original solid model 27 is shown by a broken line, while the downsized model 28 is shown by a continuous line. In the illustrated example, the bottom plane 25 of the original solid model 27 is an open plane, and other five planes are moved inward by a distance that is a sum of the thickness of the sheet metal and the minimum radius of curvature so that the downsized model 28 is generated.

Figure 9B:
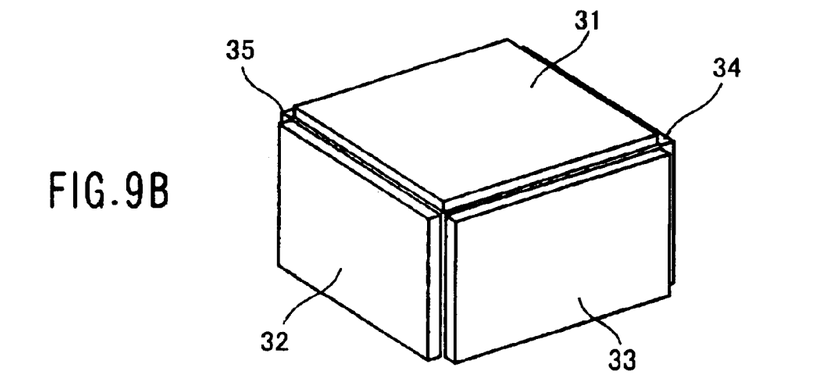

In the next step #106, the plural planes (five planes in the illustrated example) except for the open plane of the downsized model 28 are moved outward in parallel by a distance of the minimum radius of curvature, so that the inner wall surfaces are obtained. In the next step #107, the inner wall surfaces are further moved outward in parallel by a distance of the thickness of the sheet metal as a projection process, so that the plate portions 31–35 are generated. This series of processes is shown in FIG. 9B. As a result of the above-mentioned series of processes, an upper plate 31 and four side plates 32–35 having the designated thickness are generated. There is a gap that is determined by the minimum radius of curvature between the upper plate and each of the side plates, as well as between neighboring side plates.

Figure 9C:
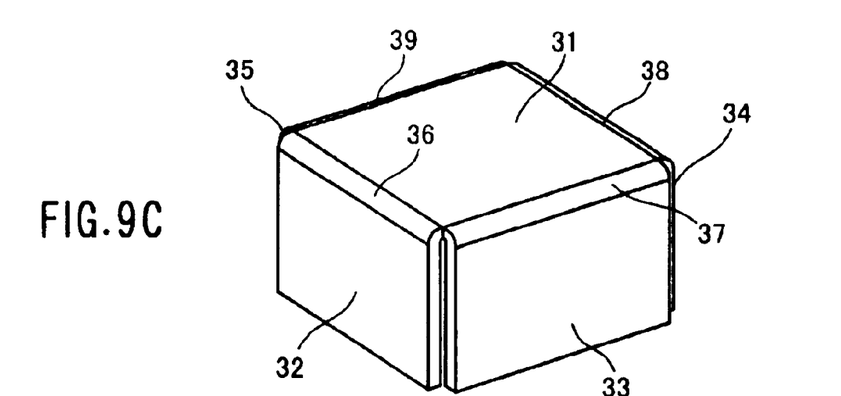

In the final step #108, bending portion forms are generated. This bending portion form means a fillet that connects neighboring plate portions. This state is shown in FIG. 9C. There is generated a bending portion form 36 that connects the upper plate 31 to the first side plate 32 (end surfaces thereof). In the same way, there are generated bending portion forms 36–39 that connect the upper plate 31 to the other side plates 33–35, respectively. Furthermore, the bending portion form (fillet) is generated only at the bending portion that was designated in the step #103. Therefore, in the illustrated example, the bending portion form is not generated between the neighboring side plates. At this portion, a butt form is generated in which one of the end surfaces of the side plates is extended to the surface of the other side plate. Generation of this butt form is not relevant directly to the present invention, so the detail explanation thereof is omitted.

Figure 10A:
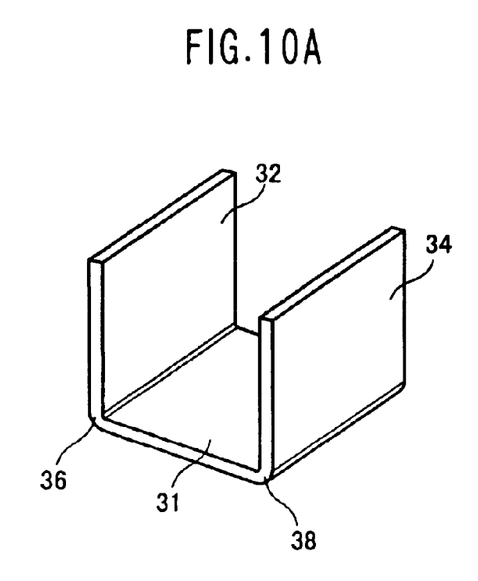
FIGS. 10A–10C show a concept of a data structure in the sheet metal model generated by the method according to the present invention.
Figure 10B:
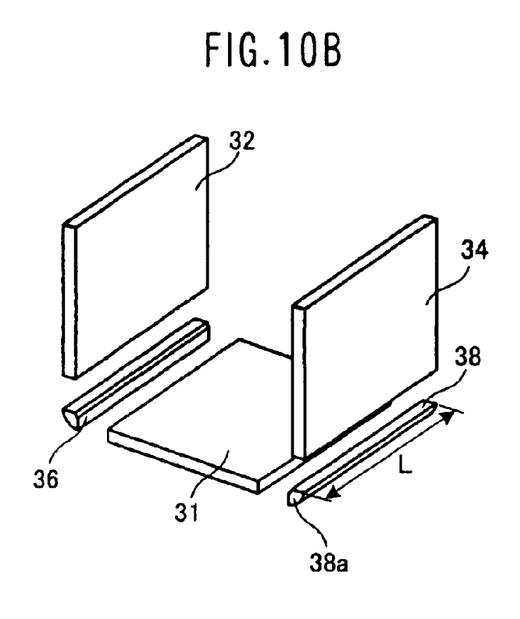
Figure 10C:
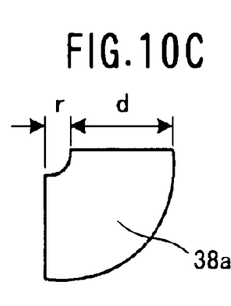

A concept of a data structure in the sheet metal model generated by the process explained above is shown in FIGS. 10A–10C. FIG. 10A shows an object that is obtained by removing the side plates 33 and 35 and the bending portion forms 37 and 39 from the sheet metal model shown in FIG. 9C, which is turned upside down (rotated by 180 degrees). FIG. 10B shows an exploded view, in which the upper plate 31, the side plates 32 and 33, and the bending portion forms 36 and 38 are separated. FIG. 10C shows the sector cross section of the bending portion form 36, the minimum radius of curvature r and the thickness d of the sheet metal.

As understood from FIG. 10B, the sheet metal model that is generated by the method of the present invention is made of a plurality of plates having a thickness of d, and a plurality of bending portion forms (fillets) having a sector cross section at the bending portions. The bending portion form (fillet) is generated by an extrusion process in which a sector cross section that is defined by the minimum radius of curvature (r), the radius (r+d) that is the minimum radius of curvature plus the thickness (d) and a bending angle (90 degrees in the illustrated example) is moved in parallel by the distance (length) of the ridge line of the designated bending portion (L in FIG. 10B).

Figure 11A:
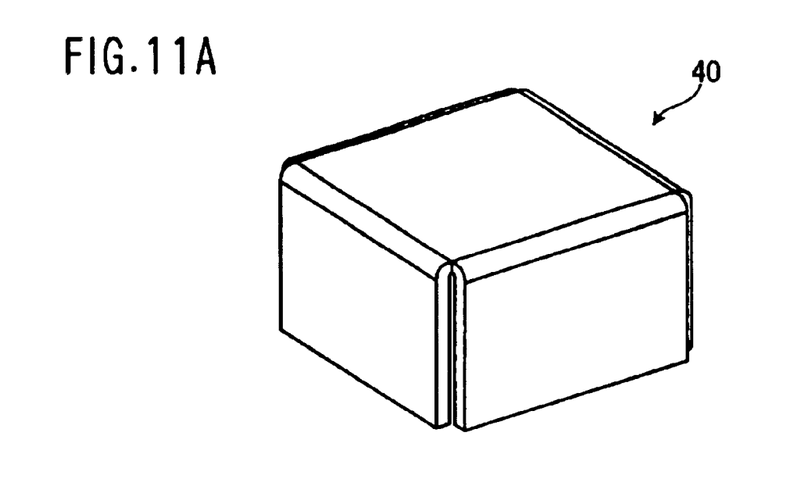
FIGS. 11A and 11B show generation of a development from the sheet metal model generated by the method according to the present invention.
Figure 11B:
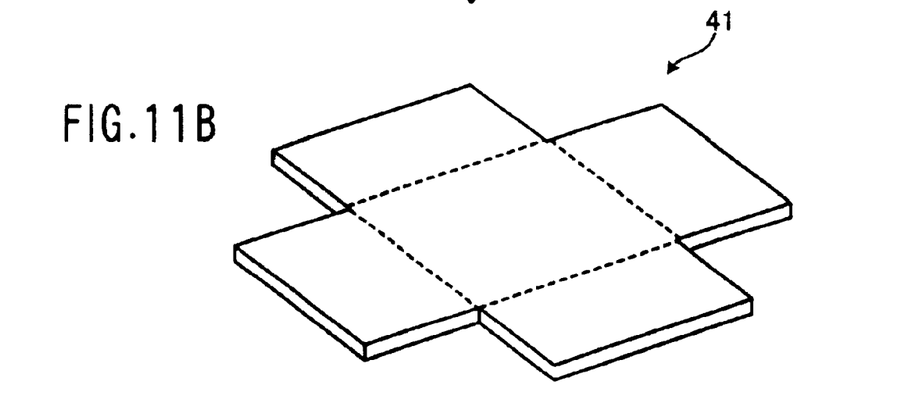

The sheet metal model having a constant thickness d that is generated by the method explained above can be unfolded automatically by a known unfolding method. This state is shown in FIGS. 11A and 11B. The sheet metal model 40 shown in FIG. 11A is unfolded so that a developed view 41 is generated as shown in FIG. 11B.

While the presently preferred embodiments of the present invention have been shown and described, it will be understood that the present invention is not limited thereto, and that various changes and modifications may be made by those skilled in the art without departing from the scope of the invention as set forth in the appended claims.

What is claimed is:

1. A method for generating a sheet metal model that can be unfolded automatically, from a solid model obtained by modeling an outer shape of a sheet metal product in a three-dimensional sheet metal CAD/CAM system, the method comprising the steps of:

assigning entered attribution information including material and thickness of a sheet metal to a specified solid model;

assigning entered designation information for designating an open plane and a bending portion to the solid model;

obtaining a minimum radius of curvature at the bending portion from the material and the thickness of the sheet metal;

generating a downsized model defined by the designated open plane and a plurality of planes that are generated by moving a plurality of planes of the solid model except the open plane inward in parallel by a distance that is a sum of the thickness of the sheet metal and the minimum radius of curvature;

generating inner wall surfaces by moving a plurality of surfaces of the downsized model except for the open plane outward in parallel by a distance that is equal to the minimum radius of curvature;

generating plate portions by a projection process in which the inner wall surfaces are further moved outward in parallel by a distance that is equal to the thickness of the sheet metal; and generating a bending portion form that is a fillet connecting neighboring plate portions at the bending portion designated in the solid model.

2. The method according to claim 1, wherein a thickness input box and a material selection pull-down menu are displayed as a screen display for entering the material and the thickness of the sheet metal, and an entered thickness value in the thickness input box is used as a key for searching a material master file so that one or more found materials registered in connection with the entered thickness value are listed in the pull-down menu.

3. A sheet metal model generation device constituting a three-dimensional sheet metal CAD/CAM system, comprising:

a solid model generation portion for generating a solid model by modeling an outer shape of a sheet metal product;

an attribution information assigning portion for assigning entered attribution information including material and thickness of a sheet metal to the solid model;

an open plane and bending portion designation portion for assigning entered designation information for designating an open plane and a bending portion to the solid model;

a minimum radius of curvature obtaining portion for obtaining a minimum radius of curvature at the bending portion from the entered material and thickness of the sheet metal;

a downsized model generation portion for generating a downsized model defined by the designated open plane and a plurality of planes that are generated by moving a plurality of planes of the solid model except the open plane inward in parallel by a distance that is a sum of the thickness of the sheet metal and the minimum radius of curvature;

a plate portion generation portion for generating inner wall surfaces by moving a plurality of surfaces of the downsized model except for the open plane outward in parallel by a distance that is equal to the minimum radius of curvature and for generating plate portions by a projection process in which the inner wall surfaces are further moved outward in parallel by a distance that is equal to the thickness of the sheet metal; and a bending portion form generation portion for generating a bending portion form that is a fillet connecting neighboring plate portions at the bending portion designated in the solid model.

4. The sheet metal model generation device according to claim 3, wherein the attribution information assigning portion makes a screen display of a thickness input box and a material selection pull-down menu, uses an entered thickness value in the thickness input box as a key for searching a material master file so that one or more found materials registered in connection with the entered thickness value are listed in the pull-down menu.

5. A computer program product that is installed in a computer that constitutes a three-dimensional sheet metal CAD/CAM system for making the computer execute the process for generating a sheet metal model including the steps of:

assigning entered attribution information including material and thickness of a sheet metal to a specified solid model;

assigning entered designation information for designating an open plane and a bending portion to the solid model;

obtaining a minimum radius of curvature at the bending portion from the material and the thickness of the sheet metal;

generating a downsized model defined by the designated open plane and a plurality of planes that are generated by moving a plurality of planes of the solid model except the open plane inward in parallel by a distance that is a sum of the thickness of the sheet metal and the minimum radius of curvature;

generating inner wall surfaces by moving a plurality of surfaces of the downsized model except for the open plane outward in parallel by a distance that is equal to the minimum radius of curvature;

generating plate portions by a projection process in which the inner wall surfaces are further moved outward in parallel by a distance that is equal to the thickness of the sheet metal; and generating a bending portion form that is a fillet connecting neighboring plate portions at the bending portion designated in the solid model.

6. The computer program product-according to claim 5, wherein a thickness input box and a material selection pull-down menu are displayed as a screen display for entering the material and the thickness of the sheet metal, and an entered thickness value in the thickness input box is used as a key for searching a material master file so that one or more found materials registered in connection with the entered thickness value are listed in the pull-down menu.

7. A computer-readable storage medium storing a computer program that is installed in a computer that constitutes a three-dimensional sheet metal CAD/CAM system for making the computer execute the process for generating a sheet metal model including the steps of:

assigning entered attribution information including material and thickness of a sheet metal to a specified solid model;

assigning entered designation information for designating an open plane and a bending portion to the solid model;

obtaining a minimum radius of curvature at the bending portion from the material and the thickness of the sheet metal;

generating a downsized model defined by the designated open plane and a plurality of planes that are generated by moving a plurality of planes of the solid model except the open plane inward in parallel by a distance that is a sum of the thickness of the sheet metal and the minimum radius of curvature;

generating inner wall surfaces by moving a plurality of surfaces of the downsized model except for the open plane outward in parallel by a distance that is equal to the minimum radius of curvature;

generating plate portions by a projection process in which the inner wall surfaces are further moved outward in parallel by a distance that is equal to the thickness of the sheet metal; and generating a bending portion form that is a fillet connecting neighboring plate portions at the bending portion designated in the solid model.

* * * * *

UNITED STATES PATENT AND TRADEMARK OFFICE
CERTIFICATE OF CORRECTION

PATENT NO. : 6,922,602 B2
DATED : July 26, 2005
INVENTOR(S) : Itoh

It is certified that error appears in the above-identified patent and that said Letters Patent is hereby corrected as shown below:

Column 10,
Line 22, change "product-according" to -- product according --.

Signed and Sealed this

Eleventh Day of April, 2006

JON W. DUDAS
*Director of the United States Patent and Trademark Office*